(12) United States Patent
Cavaleri (10) Patent No.: US 11,432,573 B2
(45) Date of Patent: Sep. 6, 2022

(54) FOOD AND BEVERAGE SWEETENERS

(71) Applicant: Franco Cavaleri, Surrey (CA)

(72) Inventor: Franco Cavaleri, Surrey (CA)

( * ) Notice: Subject to any disclaimer, the term of this patent is extended or adjusted under 35 U.S.C. 154(b) by 268 days.

(21) Appl. No.: 16/751,379

(22) Filed: Jan. 24, 2020

(65) Prior Publication Data

US 2020/0154748 A1 May 21, 2020

Related U.S. Application Data

(63) Continuation-in-part of application No. 16/483,090, filed as application No. PCT/CA2018/050911 on Jul. 26, 2018.

(60) Provisional application No. 62/537,876, filed on Jul. 27, 2017.

(51) Int. Cl.
*A23L 27/30* (2016.01)

(52) U.S. Cl.
CPC .............. *A23L 27/36* (2016.08); *A23L 27/31* (2016.08); *A23V 2002/00* (2013.01)

(58) Field of Classification Search
CPC .......... A23L 27/31; A23L 27/39; A23L 27/21; A23L 2/60
USPC ........................................................ 426/548
See application file for complete search history.

(56) References Cited

U.S. PATENT DOCUMENTS

| | | | | |
|---|---|---|---|---|
| 2007/0116822 A1* | 5/2007 | Prakash | .................. | A23L 27/34 |
| | | | | 426/548 |
| 2014/0037814 A1* | 2/2014 | Quinlan | .................. | A61K 36/42 |
| | | | | 426/548 |
| 2014/0357588 A1* | 12/2014 | Markosyan | .......... | A24B 15/302 |
| | | | | 514/34 |
| 2015/0017284 A1* | 1/2015 | Prakash | .................. | A23L 27/36 |
| | | | | 426/61 |

\* cited by examiner

*Primary Examiner* — Brent T O'Hern (57) ABSTRACT

Natural sweetener compositions are disclosed, which generally include various combinations of steviol glycosides extracted from a *Stevia rebaudiana* plant; *Siraitia grosvenorii* (Monk Fruit) plant extract (including mogrosides extracted from such plant species); and an amino acid component consisting of free glycine. The natural sweetener compositions may optionally further include *gymnemic* acid (such as an extract of a *Gymnemic sylvestre* herb that includes 25%-75% *gymnemic* acid). The natural sweetener compositions may consist essentially of those two, three, or four components—or may be included in beverages, beverage powders, and foods.

9 Claims, 4 Drawing Sheets

FOOD AND BEVERAGE SWEETENERS

CROSS-REFERENCE TO RELATED APPLICATIONS

This application is a continuation-in-part of U.S. patent application Ser. No. 16/483,090, filed on Aug. 2, 2019, which was filed under 35 U.S.C. 371 as a national stage application of PCT application number PCT/CA2018/050911, filed on Jul. 26, 2018, which claims priority to U.S. provisional application Ser. No. 62/537,876, filed on Jul. 27, 2017.

FIELD OF THE INVENTION

The field of the present invention relates to food and beverage sweeteners. More particularly, the field of the present invention relates to sweetener compositions that may serve as a replacement for traditional sugar, and which deliver a reduced level of carbohydrates to a consumer (relative to currently-available sweeteners).

BACKGROUND OF THE INVENTION

Natural sweeteners, as substitutes for traditional sugar and chemical-based artificial sweeteners, have been growing in popularity for many years. Recently, consumers have been purchasing and demanding natural sweeteners that are considered "low carbohydrate" sweeteners. For many years, "stevia" has been used as a natural sweetener (and as a sugar substitute), which generally consists of an extract from the leaves of the plant species *Stevie rebaudiana*. However, most stevia sweeteners are coupled to maltodextrin as a carrier, which adds carbohydrate to the sweetener (which is less preferred by those looking to eliminate or reduce carbohydrates from their diet). Attempts have been made to replace maltodextrin with certain digestion-resistant carbohydrates or fibers; however, those substitutes have been shown to often cause gastrointestinal distress.

In view of the foregoing, there is a continuing and growing demand for natural sweeteners, which (1) exhibit a desirable sweet taste, (2) deliver a reduced level of carbohydrates to a consumer (relative to currently-available sweeteners), and (3) do not cause gastrointestinal distress. Still further, it would be desirable for such sweeteners to facilitate insulin activity, blood sugar clearance, and/or appetite control. As the following will demonstrate, the compositions of the invention and those described herein address such demands (and others) in the marketplace.

SUMMARY OF THE INVENTION

According to certain aspects of the invention, natural sweetener compositions are provided that generally include (1) steviol glycosides extracted from a *Stevia rebaudiana* plant and (2) an amino acid component consisting of free glycine. In some embodiments, the steviol glycosides extracted from a *Stevia rebaudiana* plant may consist of a mixture of stevioside and rebaudioside-A (whereas, in other embodiments, the steviol glycosides extracted from a *Stevia rebaudiana* plant may include other steviol glycosides as well). In addition, such natural sweetener compositions may optionally include a third component, namely, *gymnemic* acid (such as an extract of a *Gymnemic sylvestre* herb that includes 25%-75% gymnemic acid). In such embodiments, the invention provides that the natural sweetener compositions may consist essentially of just those two or three components; whereas, in other embodiments, the natural sweetener compositions may comprise those two or three components along with others (e.g., fillers, carriers, water, and others).

According to additional aspects of the present invention, natural sweetener compositions are provided that generally include (1) *Siraitia grosvenorii* (Monk Fruit) plant extract (or, alternatively, purified or substantially purified mogrosides extracted from such plant species) and (2) an amino acid component consisting of free glycine. In addition, the natural sweetener compositions of such embodiments may, optionally, further include *Stevia rebaudiana* plant extracts (or a mixture of stevioside and rebaudioside-A extracted therefrom)(as described above) and/or *gymnemic* acid (as described above), including an extract of a *Gymnemic sylvestre* herb that includes 25%-75% gymnemic acid. Although such embodiments may include one or more mogrosides extracted from the *Siraitia grosvenorii* plant species, the invention provides that, in certain embodiments, the mogroside component may consist essentially of mogroside V.

The invention further encompasses beverages that include the natural sweetener compositions of the present invention. In addition, the invention encompasses a beverage powder that comprises the sweetener compositions of the present invention. Still further, the invention encompasses the natural sweetener compositions of the present invention formulated in an individualized, dry powder form, or formulated as a liquid-based sweetener. Still further, the invention encompasses ready-to-drink beverages that include the sweetener compositions described herein (including both carbonated and non-carbonated beverages).

According to yet further aspects of the present invention, methods for inducing insulinogenic activity (insulin secretion) within mammalian cells, such as pancreatic beta cells, are provided. Such methods generally comprise contacting such cells with a sweetener composition of the present invention. Such contact may occur by applying the sweetener composition directly to such cells or, alternatively, as a result of a mammalian subject consuming a sweetener composition of the present invention.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Stevia (Steviol Glycosides) & Free Glycine Compositions.

According to certain preferred embodiments of the present invention, natural sweetener compositions are provided that generally include (1) *Stevia rebaudiana* plant extract (including steviol glycosides extracted from such plant species) and (2) an amino acid component consisting of free glycine. In addition, the natural sweetener compositions of the present invention may, optionally, include *gymnemic* acid (including an extract of a *Gymnemic sylvestre* herb that includes 25%-75% *gymnemic* acid). The invention provides that the natural sweetener compositions may consist essentially of just those two or three components (i.e., primarily *Stevia rebaudiana* plant extract, free glycine, and optionally *gymnemic* acid); whereas, in other embodiments, the natural sweetener compositions may comprise those two or three components along with others. The following will describe each of those components of the present invention in further detail.

Stevia

The term "*stevia*" generally refers to a composition—used as a sweetener and sugar substitute—which is extracted from the leaves of the plant species *Stevia rebaudiana*. Such extract includes certain steviol glycosides that are primarily responsible for delivering a sweet taste upon consumption—and such glycosides primarily consist of stevioside and rebaudioside-A. Steviol is the chemical scaffold on which the steviol glycosides are based (the structure of which is represented below).

As mentioned above, the steviol glycosides that are primarily responsible for delivering a sweet taste consist of stevioside and rebaudioside-A. The IUPAC name of rebaudioside-A is 19-O-beta-glucopyranosyl-13-O-(beta-glucopyranosyl(1-2)-beta-glucopyranosyl(1-3))-beta-glucopyranosyl-13-xhydroxykaur-16-en-19-oic acid); whereas, the IUPAC name of stevioside is 13-[(2-O-beta-D-Glucopyranosyl-alpha-D-glucopyranosyl)oxy]kaur-16-en-18-oic acid beta-D-glucopyranosyl ester.

The methods by which such steviol glycosides may be extracted from *Stevia rebaudiana* plants are well known. Such methods generally entail drying the leaves of *Stevia rebaudiana* plants and subsequently performing a water extraction process (to generate a crude extract of the steviol glycosides, e.g., stevioside and rebaudioside-A). The crude extract of the steviol glycosides may then be further separated and purified via crystallization techniques, e.g., using ethanol or methanol as a solvent.

Glycine.

Glycine is an amino acid that has a single hydrogen atom as its side chain (i.e., as its R-group). The chemical formula of glycine is $NH_2$—$CH_2$—COOH, and is further represented by the structure below.

The invention provides that the glycine component of the present invention will serve multiple functions and benefits. First, the free glycine (i.e., glycine residues that are substantially unbound from each other) will serve as a carrier for the *stevia* component. In certain embodiments, the invention provides that about 4 grams of glycine is preferred (in the sweetener compositions of the invention) to deliver about 50 milligrams of *stevia* in the same sweetener composition, i.e., a 4 grams of glycine per 50 milligrams of *stevia* ratio (50 milligrams of *stevia* is typically required to sweeten a 300 mL-500 mL beverage). Second, glycine itself often confers a natural sweet taste upon consumption, thereby enhancing the sweetness of the composition. Third, replacing maltodextrin and/or digestion-resistant carbohydrates with free glycine substantially reduces (or, in some cases, may substantially eliminate) the amount of carbohydrates present in the sweetener, which is a highly desirable trait for many consumers today. In addition, by replacing maltodextrin and/or digestion-resistant carbohydrates (which are included in many currently-available sweeteners), the compositions of the present invention also mitigate the gastrointestinal distress that otherwise accompanies maltodextrin and/or digestion-resistant carbohydrates. Fourth, the inventors have found that when glycine is used to carry *stevia* in a sweetener composition, less *stevia* is required to deliver the same (or substantially the same) sweet taste. Finally, including glycine in the sweetener composition introduces a glucagon-inducing protein-like composition, which has been shown to oppose serum glucose elevation, improve insulin activity, and enhance appetite control.

*Gymnemic* Acid.

*Gymnemic* acids represent a class of chemical compounds isolated from the leaves of *Gymnema sylvestre* (*Asclepiadaceae*). Such acids generally confer an anti-sweet effect to beverages and foods. *Gymnemic* acids are triterpenoid glycosides, with aglycone gymnemagenin ($C_{30}H_{50}O_6$) serving as the base structure. The aglycone gymnemagenin may be decorated with certain sugars, such as glucoronic acid, and with various ester groups. Such derivatives represent different *gymnemic* acids. *Gymnemic* acids are generally represented by the chemical structure reproduced below.

*Gymnemic* acids may be chemically synthesized or, alternatively, extracted from a *Gymnemic sylvestre* herb. When extracted from a *Gymnemic sylvestre* herb, such extract typically comprises about 25%-75% *gymnemic* acid. As such, when included in the compositions of the present invention, synthetic *gymnemic* acids may be used—or *gymnemic* acids present within *Gymnemic sylvestre* herb extract may be used. The invention provides that the *gymnemic* acid, when present in the compositions of the present invention, will serve to mask the undesirable aftertaste that sometimes accompanies *stevia* consumption. In addition, the invention provides that the *gymnemic* acid will serve to improve insulin activity and serum glucose clearance (particularly in insulin-resistant consumers). The invention provides that when a serving of the sweetener composition of the present invention includes about 3-6 grams of glycine and 45-65 milligrams of *stevia*, it is preferred that the composition include about 25 milligrams of *gymnemic* acid. However, the invention further provides that the ratios of glycine, *stevia*, and *gymnemic* acid may be varied to achieve the desired level of sweet taste.

Formulations.

According to certain preferred embodiments of the present invention, the components of the sweetener compositions described herein are preferably formulated according to certain parameters. For example, in certain embodiments, for an average adult serving of the sweetener composition, the invention provides that the composition will preferably comprise (a) 10 mg-120 mg of steviol glycosides extracted from a *Stevia rebaudiana* plant; (b) 1000 mg-10,000 mg of free glycine; and, optionally, (c) 0.1 mg-200 mg of *gymnemic* acid. In the case of *gymnemic* acid, such component may consist of an extract of a *Gymnemic sylvestre* herb, which includes about 25%-75% *gymnemic* acid. In other embodiments, the composition may comprise (a) 15 mg 25 mg of steviol glycosides extracted from a *Stevia rebaudiana* plant; (b) 150 mg-800 mg of free glycine; and, optionally, (c) 0.1 mg-200 mg of *gymnemic* acid. The invention provides that the sweetener compositions may be formulated as stand-alone sweeteners, such as individualized packets of sweeteners in dry powder form or as liquid-based sweeteners. Alternatively, the sweetener compositions may be formulated into a beverage, beverage powder (i.e., a dry powder that, when reconstituted with water, converts into a drinkable beverage), or food product. Still further, the sweetener compositions of the present invention may be formulated as individual capsules and tablets (which, in the case of tablets, further include standard binders that are known in the art). Still further, the invention encompasses ready-to-drink beverages that include the sweetener compositions described herein (including both carbonated and non-carbonated beverages).

According to certain specific and preferred embodiments, the present invention further encompasses the following formulations:

| Formula-1 | |
|---|---|
| Component | Amount (milligrams) |
| Stevia | 10.0 |
| Glycine (Free Form) | 3000 |
| *Gymnemic sylvestre* Extract (75% Gymnemic Acid) | 5.0 |

| Formula-2 | |
|---|---|
| Component | Amount (milligrams) |
| Stevia | 10.0 |
| Glycine (Free Form) | 3000 |
| *Gymnemic sylvestre* Extract (75% Gymnemic Acid) | 0 |

| Formula-3 | |
|---|---|
| Component | Amount (milligrams) |
| Stevia | 30.0 |
| Glycine (Free Form) | 5500 |
| *Gymnemic sylvestre* Extract (75% Gymnemic Acid) | 15.0 |

| Formula-4 | |
|---|---|
| Component | Amount (milligrams) |
| Stevia | 50.0 |
| Glycine (Free Form) | 5000 |
| *Gymnemic sylvestre* Extract (75% Gymnemic Acid) | 22.0 |

| Formula-5 | |
|---|---|
| Component | Amount (milliqrams) |
| Stevia | 80.0 |
| Glycine (Free Form) | 6000 |
| *Gymnemic sylvestre* Extract (75% Gymnemic Acid) | 0 |

Monk Fruit (Mogrosides) & Free Glycine Compositions.

According to yet further preferred embodiments of the present invention, additional natural sweetener compositions are provided that generally include (1) *Siraitia grosvenorii* (Monk Fruit) plant extract (or purified mogrosides extracted from such plant species) and (2) an amino acid component consisting of free glycine. In addition, the natural sweetener compositions of such embodiments may, optionally, further include *Stevia rebaudiana* plant extract (as described above) and/or *gymnemic* acid (as described above), including an extract of a *Gymnemic sylvestre* herb that includes 25%-75% *gymnemic* acid. Although such embodiments may include an (aqueous) extract of the *Siraitia grosvenorii* plant species, and/or a mixture of one or more mogrosides that are further extracted and purified from the *Siraitia grosvenorii* plant species (such as mogrol, mogroside II $A_1$, mogroside II B, 7-oxomogroside II E, 11-oxomogroside $A_1$, mogroside III $A_2$, 11-deoxymogroside III, 11-oxomogroside IV A, mogroside V, 7-oxomogroside V, 11-oxo-mogroside V, and/or mogroside VI), the invention provides that such embodiments may preferably include purified mogroside V (a cucurbitane glycoside). Mogroside V (CAS Number 88901-36-4) has a molecular formula of $C_{60}H_{102}O_{29}$, an IUPAC designation of (3β,9β,10α,11α,24R)-3-[(6-O-β-D-glucopyranosyl-β-D-glucopyranosyl)oxy]-11,25-dihydroxy-9-methyl-19-norlanost-5-en-24-yl O-β-D-glucopyranosyl-(1→2)-O-[β-D-glucopyranosyl-(1→6)]-β-D-glucopyranoside, and is represented by the structure below.

tially of, or consist only of (a) 5 mg-45 mg of dried *Siraitia grosvenorii* fruit extract (or 40 mg-100 mg of one or more mogrosides extracted from *Siraitia grosvenorii* fruit); (b) 10 mg-120 mg of steviol glycosides extracted from a *Stevia rebaudiana* plant; (c) 1000 mg-10,000 mg of free glycine; and, optionally, (d) 0.1 mg-200 mg of *gymnemic* acid. In the case of *gymnemic* acid, such component may consist of an extract of a *Gymnemic sylvestre* herb, which includes about 25%-75% *gymnemic* acid. In the embodiments described above; the mix of mogrosides extracted from *Siraitia grosvenorii* fruit may optionally be replaced with purified (or substantially purified, such as greater than 75%, 80%, 85%, 90%, or 95% pure) forms of mogroside V.

As with the embodiments described above; the invention provides that the sweetener compositions of such embodiments may be formulated as standalone sweeteners, such as individualized packets of sweeteners in dry powder form or The methods by which such mogrosides may be extracted from *Siraitia grosvenorii* plants are well known. Such methods generally entail drying the fruit of *Siraitia grosvenorii* plants and subsequently performing a liquid extraction process (to generate a crude extract of the mogrosides)—such liquid extractions may involve the use of, e.g., hexane:ethanol, (¼ v/v) or subcritical water ($scH_2O$). The crude extract of the mogrosides may then be further separated and purified via crystallization and/or chromatographic techniques. Alternatively, purified forms of the mogrosides, such as mogroside V, may be purchased from commercial suppliers and included in the sweetener compositions described herein.

In such embodiments; the sweetener compositions may preferably be formulated according to certain parameters (using either liquid or dry powder forms of Monk Fruit (mogroside) extracts). For example, in certain embodiments, for an average adult serving of the sweetener composition; the invention provides that the composition may preferably comprise; consist essentially of, or consist only of (a) 5 mg-45 mg of dried *Siraitia grosvenorii* fruit extract (or 40 mg-100 mg of one or more mogrosides extracted from *Siraitia grosvenorii* fruit); (b) 1000 mg-10,000 mg of free glycine; and, optionally, (c) 0.1 mg-200 mg of *gymnemic* acid. In yet further embodiments, the invention provides that the composition may preferably comprise, consist essenas liquid-based sweeteners. Alternatively, the sweetener compositions may be formulated into a (carbonated or non-carbonated) beverage, beverage powder (i.e., a dry powder that, when reconstituted with water, converts into a drinkable beverage), or food product. Still further, the sweetener compositions of the present invention may be formulated as individual capsules; tablets (which, in the case of tablets, further include standard binders that are known in the art); and gels.

In addition, as described herein, the invention provides that one or more (or all) of the individual components that comprise a sweetener composition of the present invention (including *Stevia rebaudiana* plant extract; steviol glycosides; stevioside; rebaudioside-A; free glycine; *Gymnemic sylvestre* extract; *Gymnemic* acids; *Siraitia grosvenorii* plant extract; and mogrosides, such as mogroside V) may exist in a purified or substantially purified condition when added to formulate the desired sweetener composition, such as greater than 75%, 80%, 85%, 90%, or 95% pure (i.e., 75%, 80%, 85%, 90%, or 95% free from other unwanted agents or contaminants).

According to certain specific and preferred embodiments, the present invention further encompasses the following specific formulations:

5 mg Stevioside+15 mg Mogroside+1,000 mg L-Glycine.

5 mg Stevioside+15 mg Mogroside+1,000 mg L-Glycine+25 mg Gymnenic Acid.

10 mg Stevioside+15 mg Mogroside+1,000 mg L-Glycine.

10 mg Stevioside+20 mg Mogroside+1,000 mg L-Glycine+25 mg Gymnenic Acid.

20 mg Mogroside+1,000 mg L-Glycine.

20 mg Mogroside+1,000 mg L-Glycine.

20 mg Mogroside+1,000 mg L-Glycine+25 mg *Gymnemic* Acid.

25 mg Mogroside+1,000 mg L-Glycine+25 mg *Gymnemic* Acid.

25 mg Mogroside+1,000 mg L-Glycine.

25 mg Mogroside+1,600 mg L-Glycine.

23 mg Mogroside+4,000 mg L-Glycine.

20 mg Mogroside+1,000 mg L-Glycine.

20 mg Mogroside+1,600 mg L-Glycine.

22 mg Mogroside+1,800 mg L-Glycine.

20 mg Mogroside+4,000 mg L-Glycine.

27 mg Mogroside+1,000 mg L-Glycine.

27 mg Mogroside+1,600 mg L-Glycine.

30 mg Mogroside+1,000 mg L-Glycine.

25 mg Mogroside+6,000 mg L-Glycine.

20 mg Mogroside+6,000 mg L-Glycine.

(15-30 mg) Mogroside+(150-800 mg) L-Glycine.

(15-25 mg) Stevioside+(15-30) mg Mogroside+(150-800) mg L-Glycine.

According to yet additional preferred embodiments, the present invention further encompasses methods of inducing insulinogenic activity (insulin secretion) within mammalian cells, such as pancreatic beta cells. Such methods generally comprise contacting such cells with a sweetener composition of the present invention. Such contact may occur by applying the sweetener composition directly to such cells or, alternatively, as an indirect result of a human subject consuming a sweetener composition of the present invention.

EXAMPLES

Example 1

The following Example summarizes the impact of the above-listed formulas on serum glucose levels within three different subjects. Specifically, 6.0 grams of a blend of Formula-1 through Formula-5 (above) were stirred vigorously into one shot of regular caffeinated expresso coffee that was topped to 350 milliliters of warm water. The coffee was then completely consumed by each subject within 5 minutes, following a time=0 measurement of each subject's serum glucose levels. Each subject's serum glucose levels were subsequently measured at 15 minute intervals, up to 100 minutes following the time=0 measurement. The impact of traditional sucrose on each of the subject's serum glucose levels was also measured, so that the impact of the test sweetener composition on serum glucose levels could be measured relative to such impact by traditional sucrose. The following Tables summarize the serum glucose level measurements observed with each subject (Table-1, Table-2, and Table-3), along with the average across each of the three subjects (Table-4)(the data represent mmol/L serum glucose).

TABLE 1

(Subject 1)

| | Test | Sucrose |
|---|---|---|
| T = 0 | 5.20 | 5.20 |
| T = 15 | 5.40 | 6.20 |

TABLE 1-continued (Subject 1)

| | Test | Sucrose |
|---|---|---|
| T = 30 | 5.30 | 7.60 |
| T = 45 | 5.50 | 7.60 |
| T = 60 | 5.20 | 7.00 |
| T = 75 | 5.30 | 6.20 |
| T = 100 | 5.40 | 6.00 |

TABLE 2

(Subject 2)

| | Test | Sucrose |
|---|---|---|
| T = 0 | 5.00 | 5.10 |
| T = 15 | 5.00 | 6.00 |
| T = 30 | 5.40 | 7.50 |
| T = 45 | 5.40 | 7.40 |
| T = 60 | 5.60 | 7.00 |
| T = 75 | 5.40 | 6.00 |
| T = 100 | 5.40 | 5.60 |

TABLE 3

(Subject 3)

| | Test | Sucrose |
|---|---|---|
| T = 0 | 4.90 | 5.20 |
| T = 15 | 5.30 | 5.60 |
| T = 30 | 5.30 | 7.70 |
| T = 45 | 5.30 | 7.80 |
| T = 60 | 5.20 | 7.40 |
| T = 75 | 5.30 | 6.40 |
| T = 100 | 5.20 | 6.20 |

TABLE 4

(Average)

| | Test | Sucrose |
|---|---|---|
| T = 0 | 5.03 | 5.17 |
| T = 15 | 5.23 | 5.93 |
| T = 30 | 5.33 | 7.60 |
| T = 45 | 5.40 | 7.60 |
| T = 60 | 5.33 | 7.13 |
| T = 75 | 5.33 | 6.20 |
| T = 100 | 5.33 | 5.93 |

Figure 1:
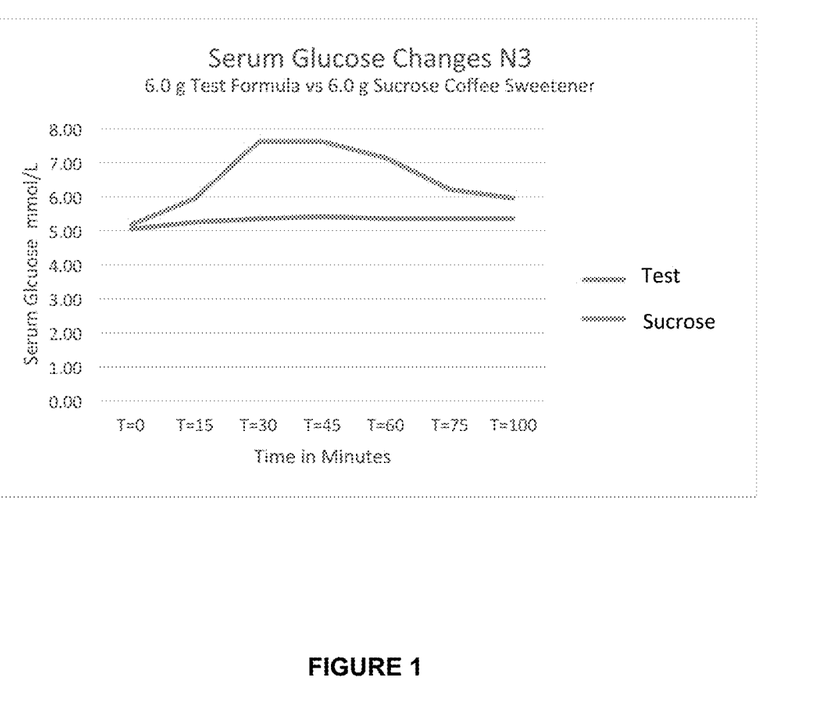
FIG. 1: a line graph summarizing the impact of a *Stevia*-containing sweetener composition of the present invention (and traditional sucrose) on serum glucose levels in multiple subjects.

As shown in the Tables above, and as further illustrated in FIG. 1, the sweetener (test) composition of the present invention did not cause serum glucose levels to elevate to the same extent as traditional sucrose. In fact, the sweetener (test) composition was much more effective at maintaining stable serum glucose levels in each subject, relative to traditional sucrose.

Example 2

The following Example summarizes the impact of certain formulas and compositions included in the present invention on glucose metabolism at systemic and cellular levels—and, furthermore, demonstrates that formulas and compositions included in the present invention can induce insulinogenic activity (insulin secretion) from pancreatic beta cells. The impact of glucose and Glyburide were also tested for insulinogenic activity (insulin secretion), to serve as a baseline for assessing the activity of the compositions of the present invention (listed as Glyvia in FIG. 2). The "Glyvia" compositions that were tested in this Example included the following: (1) Glyvia HD (High Density): 22.5 mg stevioside complex and 1,600 mg L-glycine; and (2) Glyvia 1:1: one unit of sucrose to one unit of Glyvia (which consisted of 22.5 mg stevioside complex and 4,500 mg L-glycine).

More particularly, the foregoing compositions of the present invention (and, separately, glucose and Glyburide) were administered to mouse pancreatic beta cells (Min6 cell line) to assess the effect of such compositions on insulin secretion. The Min6 cells were plated on a 96-well plate, at a concentration of 10,000 cells per well. The cells were then cultured overnight with high glucose containing DMEM media. The next day, the media was replaced with fresh DMEM with low glucose, along with the test compositions of the present invention. Next, an ELISA assay (provided by Abcam) was used to quantify the insulin secreted into the media by the cells following the manufacturer's instructions. As mentioned above, the insulinogenic activity was also compared between control, glucose-treated, test-composition treated, and Glyburide-treated (a commercially-available drug for type II diabetes) cells. For each experimental cohort, three biological repeats were conducted. An ANOVA was performed to calculate the statistical significance.

Figure 2:
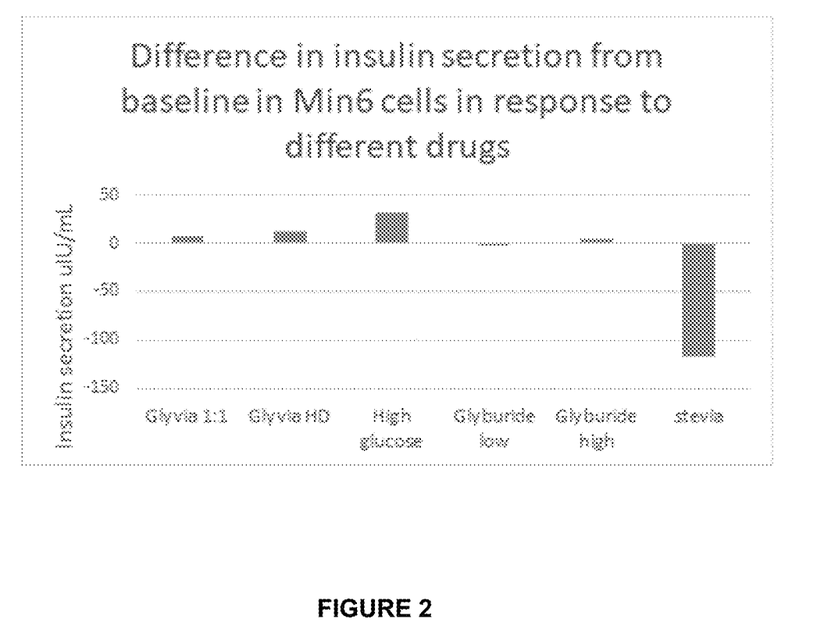
FIG. 2: a bar graph summarizing the impact of a *Stevia*-containing sweetener composition of the present invention, glucose, and glyburide on insulin secretion in Min6 cells.

As shown and summarized in FIG. 2, the ability of the compositions of the present invention (referred to as Glyvia) to induce insulin secretion exceeds the activity observed for Glyburide (a commercially-available drug for type II diabetes, which is administered for the same purpose). Such data show that the compositions of the present invention exhibit favorable insulinogenic activity.

Example 3

The following Examples 3 and 4 summarize the impact of certain mogroside-containing compositions included in the present invention on glucose metabolism at systemic and cellular levels—and, furthermore, demonstrates that such additional compositions are effective to induce insulinogenic activity (insulin secretion) from pancreatic beta cells. In this Example 3 (as in Example 2 above), impact of glucose and Glyburide were also tested for insulinogenic activity (insulin secretion), to serve as a baseline for assessing the activity of the mogroside-containing compositions of the present invention (listed as Glyvia in FIG. 3). The "Glyvia" compositions that were tested in this Example, and shown in FIG. 3, included the following: (1) Glyvia HD/HDM (High Density): 22.5 mg of mogroside V complex and 1,600 mg L-glycine; and (2) Glyvia 1:1: one unit of sucrose to one unit of Glyvia (which consisted of 22.5 mg of mogroside V complex and 4,500 mg L-glycine). Although 22.5 mg of mogroside V complex was used in this Example, the invention provides that 16-30 mg of mogroside V complex (or 16-30 mg of a mixture of mogrosides extracted from *Siraitia grosvenorii* plant fruit) could have been employed.

More particularly, as in Example 2 above, the foregoing mogroside test compositions of the present invention (and, separately, glucose and Glyburide) were administered to mouse pancreatic beta cells (Min6 cell line) to assess the effect of such compositions on insulin secretion. The Min6 cells were plated on a 96-well plate, at a concentration of 10,000 cells per well. The cells were then cultured overnight with high glucose containing DMEM media. The next day, the media was replaced with fresh DMEM with low glucose, along with the test compositions of the present invention. Next, an ELISA assay (provided by Abcam) was used to quantify the insulin secreted into the media by the cells following the manufacturer's instructions. As mentioned above, the insulinogenic activity was also compared between control (glucose) treated, high glucose-treated, test composition-treated (including Glyvia HD/HDM and Glyvia 1:1), and Glyburide-treated (a commercially-available drug for type II diabetes) cells. For each experimental cohort, three biological repeats were conducted. An ANOVA was performed to calculate the statistical significance.

Figure 3:
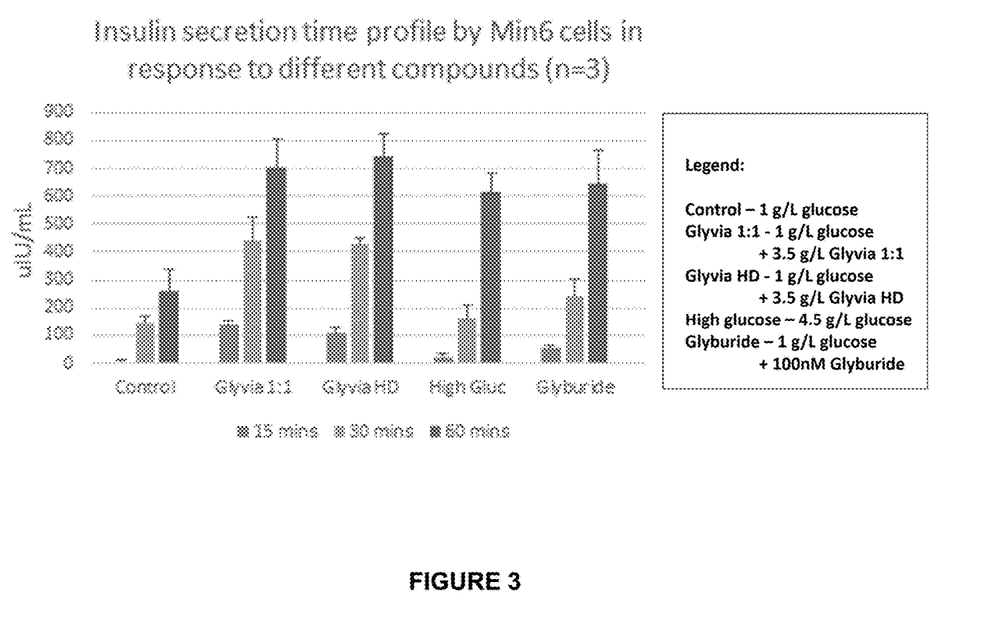
FIG. 3: a bar graph summarizing the impact of a mogroside-containing sweetener composition of the present invention, glucose, and glyburide on insulin secretion in Min6 cells.

As shown and summarized in FIG. 3, the ability of the mogroside-containing compositions of the present invention (e.g., Glyvia HD/HDM) to induce insulin secretion exceeds the activity observed for Glyburide (a commercially-available drug for type II diabetes, which is administered for the same purpose). Such data show that the mogroside-containing compositions of the present invention exhibit favorable insulinogenic activity.

Example 4

Figure 4:
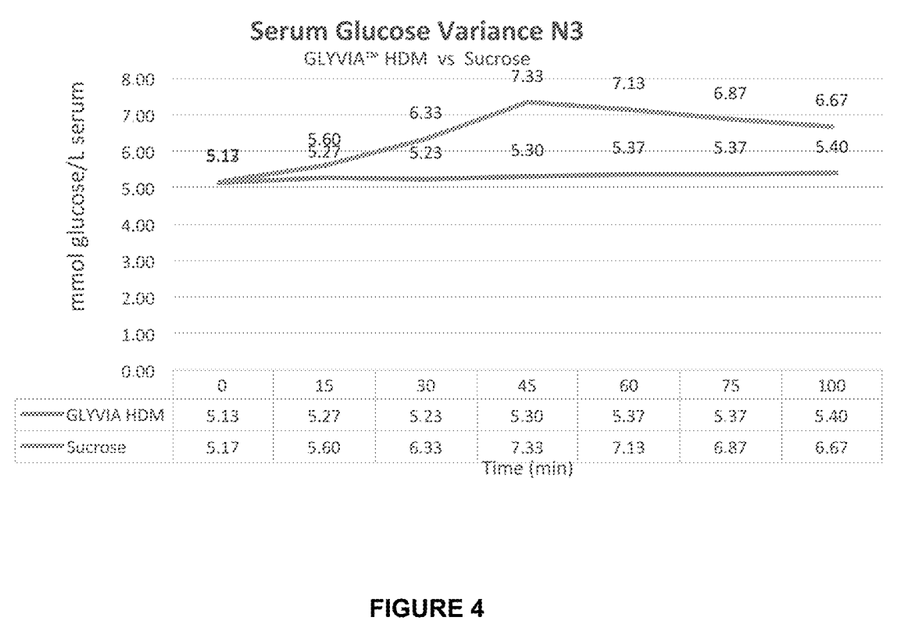
FIG. 4: a line graph summarizing the impact of a mogroside-containing sweetener composition of the present invention (and traditional sucrose) on serum glucose levels in multiple human subjects.

The following Example summarizes the impact of the mogroside-containing compositions of the invention on serum glucose levels within three different human subjects. Specifically, 6.0 grams of Glyvia HD/HDM (22.5 mg of mogroside V complex and 1,600 mg L-glycine) was stirred vigorously into one shot of regular caffeinated expresso coffee that was topped to 350 milliliters of warm water. The coffee was then completely consumed by each subject within 5 minutes, following a time=0 measurement of each subject's serum glucose levels (using a glucometer). Each subject's serum glucose levels were subsequently measured at 15 minute intervals, up to 100 minutes following the time=0 measurement. The impact of traditional sucrose on each of the subject's serum glucose levels was also measured (6.0 grams added to the same volume of coffee beverage to which Glyvia HD/HDM was added), so that the impact of the test sweetener composition on serum glucose levels could be measured relative to such impact by traditional sucrose. FIG. 4 summarizes the average serum glucose level measurements observed across each of the three subjects (the data represent mmol/L serum glucose).

As shown in FIG. 4, the sweetener/test composition (Glyvia HDM) of the present invention did not cause serum glucose levels to elevate to the same extent as traditional sucrose. In fact, the test composition was much more effective at maintaining stable serum glucose levels in each subject, relative to traditional sucrose.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:
1. A composition for adding a sweet flavor to foods and beverages, which consists essentially of:
    (a) mogrosides extracted from a *Siraitia grosvenorii* plant; and
    (b) an amino acid component consisting of free glycine.

2. The composition of claim 1, which further includes gymnemic acid.

3. The composition of claim 1, wherein the mogrosides is mogroside V.

4. The composition of claim 1, wherein the composition is effective to induce insulinogenic activity within pancreatic beta cells.

5. A composition for adding a sweet flavor to foods and beverages, which consists essentially of:
   (a) mogrosides extracted from a *Siraitia grosvenorii* plant;
   (b) an amino acid component consisting of free glycine: and
   (c) steviol glycosides extracted from a *Stevia rebaudiana* plant.

6. The composition of claim 5, which further comprises gymnemic acid.

7. The composition of claim 1, wherein the gymnemic acid consists of an extract of a Gymnemic sylvestre herb, wherein said extract comprises 25%-75% gymnemic acid.

8. The composition of claim 5, wherein the mogrosides is mogroside V.

9. The composition of claim 5, wherein the composition is effective to induce insulinogenic activity within pancreatic beta cells.

\* \* \* \* \*